(No Model.) 2 Sheets—Sheet 1.

J. T. DOUGINE.
DUMPING WAGON.

No. 247,807. Patented Oct. 4, 1881.

Witnesses: Inventor:
James T. Dougine
By his Attys., (No Model.) 2 Sheets—Sheet 2.

J. T. DOUGINE.
DUMPING WAGON.

No. 247,807. Patented Oct. 4, 1881.

Witnesses:

Inventor:
James T. Dougine,
By his Attys.

UNITED STATES PATENT OFFICE.

JAMES T. DOUGINE, OF SAN FRANCISCO, CALIFORNIA.

DUMPING-WAGON.

SPECIFICATION forming part of Letters Patent No. 247,807, dated October 4, 1881.

Application filed March 3, 1881. (No model.)

*To all whom it may concern:*

Be it known that I, JAMES T. DOUGINE, of the city and county of San Francisco, in the State of California, have invented an Improved Dump-Wagon; and I do hereby declare that the following is a full, clear, and exact description thereof, reference being had to the accompanying drawings.

My invention relates to an improved wagon-bed bottom, and method of dumping loads of loose material therethrough; and it consists of a novel arrangement of hinged or journaled sections which are arranged to support each other when closed and to release each other successively in discharging or dumping a load, all as hereinafter more fully described.

Figure 1:
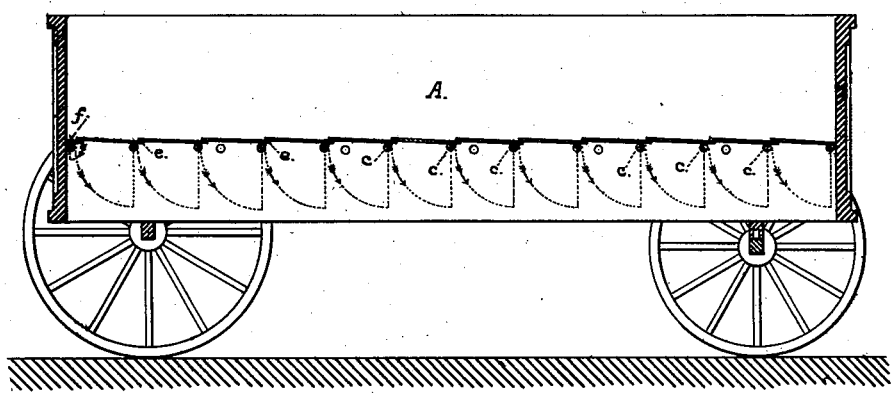
Figure 2:
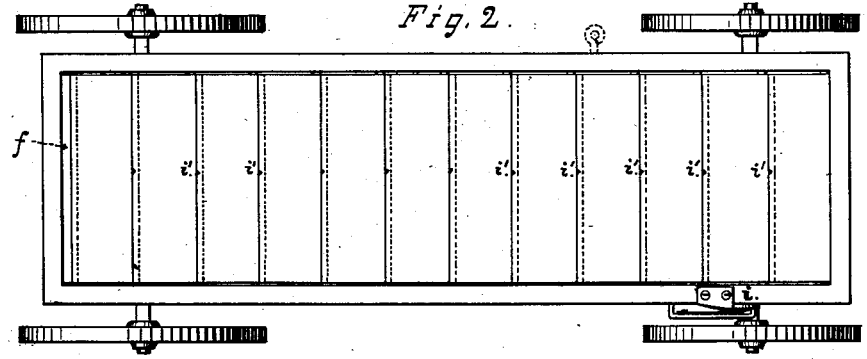
Figure 3:
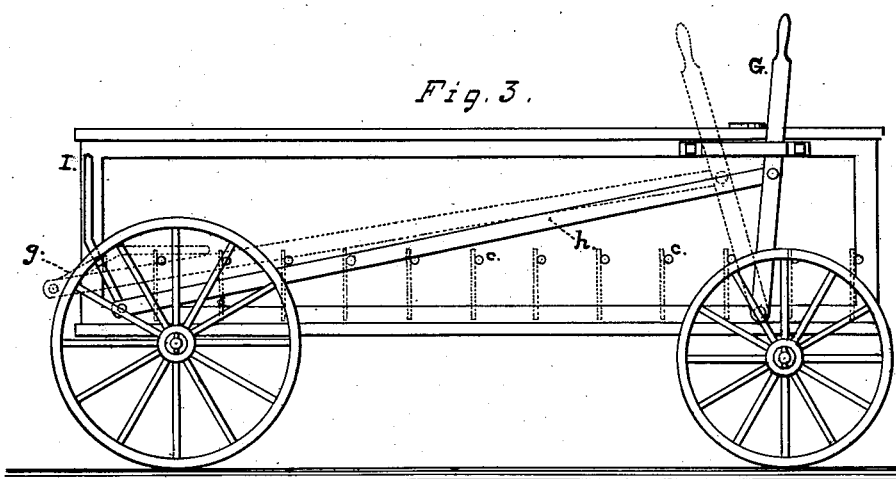
Figure 4:
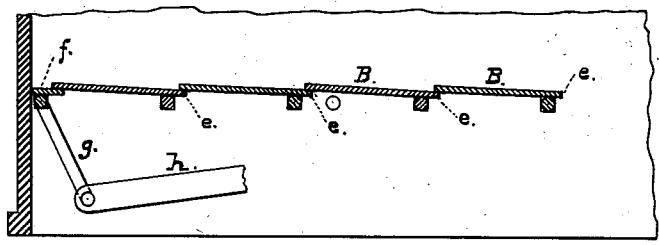
Figure 5:
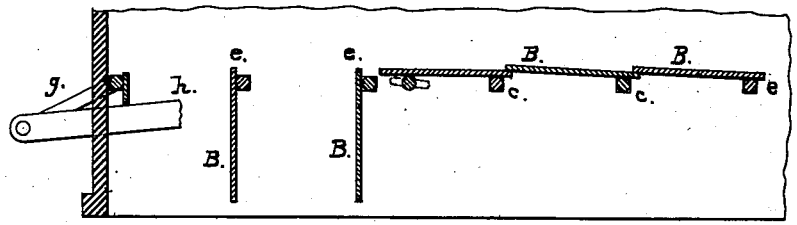

Referring to the accompanying drawings, Figure 1 is a vertical longitudinal section of my improved wagon. Fig. 2 is a top view. Fig. 3 is a side elevation. Figs. 4 and 5 are enlarged detail views, showing the operation of the sections which form the bottom.

A is a wagon-bed or other carrying box, which can be made of any desired size or shape. The bottom or floor of this wagon-bed or box I construct of a number of hinged or journaled leaves or sections, B, all of the sections or leaves being mounted in nearly the same plane. Each leaf or section extends transversely across the width of the bed or box and is supported by a journal, c, at each end, which enters a suitable bearing in the side of the box. Usually I shall secure each leaf or section upon a transverse shaft, the ends of which form the journals, instead of forming the journals or the sections; but either plan can be adopted. I will, however, for the purpose of this specification, describe the sections as being secured upon shafts as the most convenient method of describing the construction and operation of the bottom of the wagon-bed. The width of the sections is immaterial, but in practice I make them about twelve inches wide. Each section or plate is secured upon its shaft near one edge—that is, the shaft passes under it close to one edge, leaving a narrow strip (marked e) projecting over the shaft on one side while the main width of the plate or section projects on the opposite side, so that the plates will naturally hang vertical on their journals.

In constructing a wagon-bed bottom the shafts are spaced equally apart and the sections are secured to them so that the wide portions are all on the same side of the rods. The narrow portion of each section which projects over its shaft is wide enough to allow the edge of the adjoining section to rest upon it when the sections are raised above the shafts to a horizontal position, as represented at Figs. 1 and 4, so that each section is supported in its horizontal or load-supporting position by the section next to it throughout the entire length of the bottom. The last section, when raised, rests upon a hinged projecting ledge, $f$, the shaft of which has a crank-arm, $g$, connected with it at one end, and the end of this crank is connected with a lever, G, by a connecting-rod, $h$, on the outside of the bed. The lever G, when thrown forward, engages with a notch, $i$, so as to hold the projecting ledge firmly in place when the edge of the last section is resting upon it. Now, when the wagon is loaded, if the lever G be released from the notch $i$ and moved back, the ledge $f$ is lowered so that the section which rests upon it will drop and dump the material which rests upon it down through the space between its shaft and the ledge. The dropping of this leaf or section releases the next section whose edge rested upon its rearwardly-projecting edge, and so on successively throughout the length of the floor or bottom until all are dropped and the entire load dumped.

The operation of dumping is almost instantaneous, as the weight upon each section causes it to drop the instant its edge is released by the dropping of the section in front of it. After the load has been dumped, the sections are raised successively one after the other until the whole number is raised to their closed position, after which the last one is supported by the ledge $f$, as above described. To do this conveniently I cut a notch, $i'$, on the edge of each plate or section, at or near its middle, and the driver, after a load has been dumped, uses a rod with a bend or hook at its end, with which he reaches down and lifts each section by placing the rod in the notches. The notch receives the rod and allows it to pass up with the plate without interfering with the shaft in front, and as the sections are successively raised and rested on the one in front the driver can walk upon them as he raises the other sections until the last one is raised. He then reaches down, and by means of a lever, I, which is connected with the shaft of the ledge f, throws the lever G forward into its notch, thus completing the closing of the bottom.

With this sectional bottom the wagon can be dumped without stopping the team.

In order to provide for dumping the load in several piles or places, so that only a portion will be dumped at each place, I make a hole through one side of the wagon-bed just below the line of each leaf or section and opposite its outer edge, so that by inserting a pin, k, through the hole until it projects under the leaf or section the fall of the section is prevented. For instance, if I want to dump the load or three sections in one place, I insert the pin through the hole opposite the fourth section, so that when I release the lever G and drop the ledge f the three last sections will drop, but the pin will stop the fourth, and consequently none of the other sections will be released. I can thus dump the load in as many piles as there are sections.

The sections can be mounted longitudinally in the same way, so as to dump from the sides instead of from the ends; but for an ordinary dump-wagon I prefer the transverse arrangement.

Having thus described my invention, what I claim, and desire to secure by Letters Patent, is—

1. A dumping-floor or wagon-bed bottom composed of independent sections or leaves B B, each of which is supported on journals in the sides of the bed, at or near one corner, so that when closed each section will be supported by the rear projecting edge, e, of the section in front of it, in combination with the ledge f for supporting the edge of the last section of the series, the shaft on which said ledge is mounted having a crank-arm, g, which is connected with the locking-lever G by a connecting-rod, h.

2. In a dumping-floor or wagon-bed, a bottom composed of independent hinged sections B B, with the notch i in the edge of each section, substantially as and for the purpose described.

In witness whereof I have hereunto set my hand and seal.

JAMES T. DOUGINE. [L. S.]

Attest:
　WM. T. CLARK,
　EDWARD E. OSBORN.